March 10, 1970     D. L. BROOKS     3,499,595
COLLAPSIBLE FOOD AND BEVERAGE SERVICE TRAY
Filed Feb. 23, 1968

INVENTOR
DURWARD L. BROOKS

BY

ATTORNEY

United States Patent Office 3,499,595
Patented Mar. 10, 1970

3,499,595
COLLAPSIBLE FOOD AND BEVERAGE SERVICE TRAY
Durward L. Brooks, P.O. Box 467,
Pensacola, Fla. 32502
Filed Feb. 23, 1968, Ser. No. 707,798
Int. Cl. B65d 5/48
U.S. Cl. 229—28                               3 Claims

ABSTRACT OF THE DISCLOSURE

A collapsible one-use paperboard service tray for drive-in restaurants and the like having self-contained means for leveling and stabilizing the tray and its contents on the slanting surface of an automobile seat. The construction makes use of the seat back to support part of the load on the tray. Optionally, the tray may also be used on a level surface.

BACKGROUND OF THE INVENTION

A distinct need exists for a very economical food and beverage service tray primarily for use at drive-in restaurants. A completely satisfactory tray of this character must be capable of supporting a fairly heavy load of beverage containers and food in a substantially level manner and with stability on the slanting surface of an automobile seat. Service trays commonly in use are made of flimsy paperboard or like material and are designed for discarding after a single use. No tray of this character known in the prior art has been capable of resting on an automobile seat in an approximately level condition and in a stabilized manner. Consequently, much inconvenience has been experienced by the users of prior art trays due to spilling of beverages and food on clothing and automobile upholstery. The conventional trays are generally balanced in a haphazard manner on the front portion of the seat or the standing beverage containers are allowed to lean against the seat back in a very precarious manner.

An example of one prior art service tray in common usage to which the present invention has been applied is the collapsible tray disclosed in United States Patent 3,140,035, issued to Wenzel on July 7, 1964. The paperboard tray of this patent is furnished in a collapsed and flat condition and may be quickly erected for use and locked in the use position by a pair of foldable partitions or braces which also form marginal walls of a central food compartment. Beverage container compartments are provided in the erected tray on opposite sides of the food compartment. The tray is rectangular in overall configuration and rather shallow and quite flimsy. No means are provided for stabilizing or leveling the same on an automobile seat where the tray of necessity is most usually placed while the food and beverages are being consumed.

The invention overcomes the stated deficiency of the Wenzel tray and others similar to it known in the prior art through the provision of a self-contained extremely simplified leveling and stabilizing means which enables the tray to be used optionally on a level surface or a slanting surface and which does not add appreciably to the cost of the tray. Neither does the invention interfere in the slightest with the normal setting up or collapsing of the tray or its normal usage for supporting food and beverages.

The provision of the invention on the service tray requires no additional material and practically no additional manufacturing steps with the result that the tray is rendered much more useful and convenient in the performance of its intended usage. The invention allows the service tray to be utilized on substantially any standard make of automobile presently on the market.

SUMMARY OF THE INVENTION

The service tray embodying the invention is preferably formed of paperboard having a reasonable degree of stiffness and includes top and bottom walls and shallow side walls when in an erected condition. The ends of the tray are open and the erected structure is rather shallow and rectangular in transverse cross section.

A pair of foldable flaps on the central portion of the top wall are swung downwardly to brace the tray and maintain it erected and these flaps or partitions form one pair of side walls of a central food compartment for sandwiches and the like. Longitudinally extending hinged braces interconnect the top and bottom walls of the erected tray outwardly and on opposite sides of the food compartment. A pair of beverage container openings is formed through the top wall of the tray near each end portion thereof outwardly of the food compartment and on opposite sides of the aforementioned hinged braces. The tray collapses readily to a thin and flat condition for packaging and handling prior to usage.

The leveling and stabilizing means of the invention proper comprises plural prop extensions or legs formed of material from the tray bottom wall and permanently hingedly connected to the tray adjacent one longitudinal side wall thereof. Preferably, there is a large single leg near the center of the tray to be used when lighter loads are being supported and an additional pair of relatively narrow legs near the opposite ends of the tray to be used along with the center leg when heavier loads are encountered. A very important feature of the invention resides in the fact that the legs cooperate in a unique manner with the back of the automobile seat to support and stabilize the tray in a level condition on the slanting seat. That is to say, the legs which, like the remainder of the tray are formed of flimsy paperboard, do not have to bear the full weight of the food and beverage load, as a portion of this weight is transmitted through the legs to the back of the seat.

DESCRIPTION OF THE PREFERRED EMBODIMENT

Figure 1:
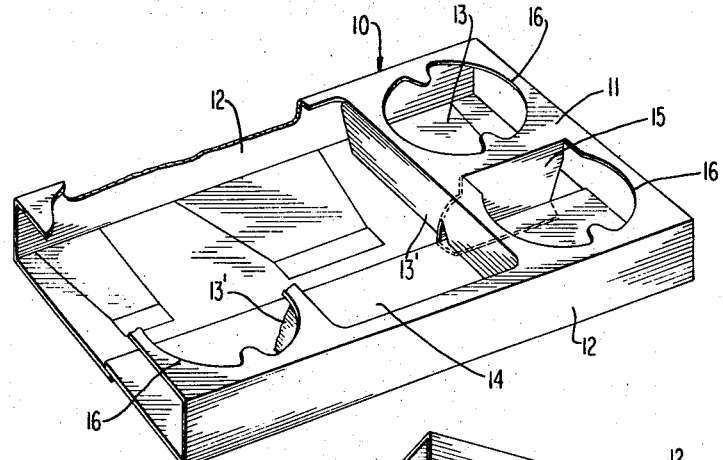
FIGURE 1 is a top perspective view, partly broken away, showing a service tray embodying the invention.

Referring to the drawings wherein like numerals designate like parts throughout the same, the numeral 10 designates a collapsible paperboard food and beverage service tray of the general type widely used by at least one large nationwide drive-in service restaurant. The general construction of the tray 10, minus the present invention, is disclosed in the aforementioned United States Patent 3,140,035 and therefore a very brief description of the general construction will suffice herein.

As disclosed in said patent, the tray 10 comprises, when in the erected condition shown in the drawings, a top wall 11, shallow longitudinal side walls 12 and a flat bottom wall 13, the opposite ends of the tray being open and the erected tray being rectangular in cross section. The tray 10 is easily locked and maintained in the erected condition by swinging downwardly from the plane of the top wall 11 a pair of hinged flaps or partitions 13' which, while in their use positions, constitute one pair of side walls of a central rectangular food compartment 14 for sandwiches and like food articles. An additional pair of longitudinal hinged braces 15 near each end of the tray aid in supporting the same in the erected condition. A pair of beverage container openings 16 is provided in the top wall 11 near each end of the tray and on opposite sides of the braces 15, as shown. Beverage containers or cups placed within the openings 16 have their bottoms resting upon the bottom wall 13 of the tray. As disclosed in said patent, the entire tray collapses or folds down to a flat condition consisting essentially of two thicknesses of the paperboard material for which the tray is made.

The invention proper, constituting a convenient means for leveling and stabilizing the tray 10 while it is supporting a load on the slanting surface 17 of an automobile seat, comprises the following. A single relatively wide supporting leg or prop 18 formed from part of the material in the bottom wall 13 is permanently and integrally hinged to the bottom of the tray adjacent one longitudinal edge thereof, as shown clearly in FIGURE 2. Preferably, central leg 18 tapers from its hinged connection to the tray toward its free end. The end of the leg 18 carries a relatively narrow foldable flap or foot 19 which rests directly on the automobile surface during use. The length of the prop or leg 18 is sufficient to support the tray in an approximately level condition on the average standard automobile seat whose slope or inclination is a known factor.

On opposite sides of the central leg 18 and near the ends of the tray structure, an additional pair of relatively narrow legs 20 are provided out of the material of the bottom wall 13 and these legs are likewise permanently hinged to the tray structure at one longitudinal edge thereof. The legs 20 also taper somewhat from their points of attachment to the tray and carry at their free ends hinged flaps or feet 21 for the purpose already described in connection with the foot 19. The legs 20 are of equal length with the central leg 18. As previously mentioned, it is intended that the central leg 18 be used alone when relatively light loads are placed in the tray structure, whereas the three legs 18 and 20 are used together under relatively heavy loads.

Figure 4:
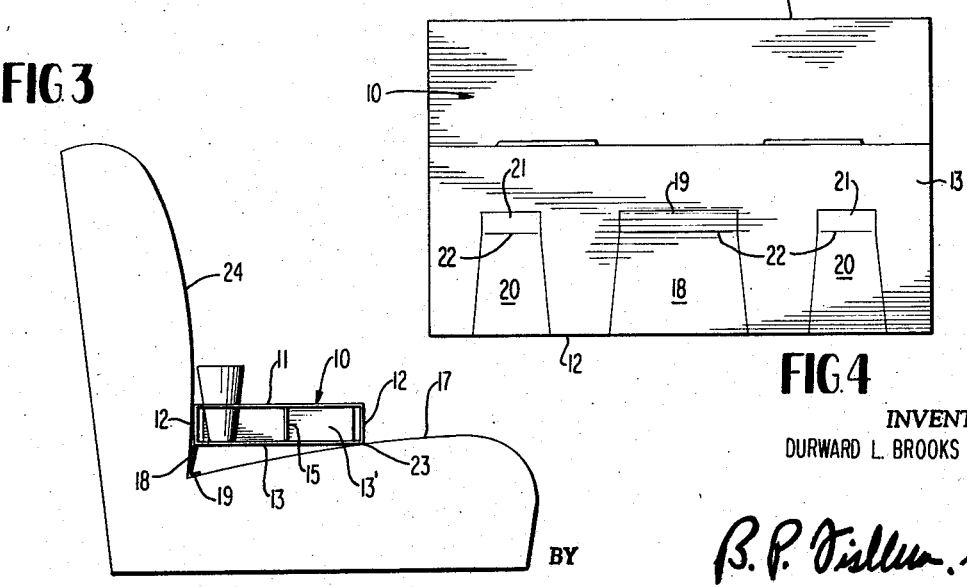
FIGURE 4 is a bottom plan view of the tray with its legs in a non-use position.

With particular reference to FIGURE 4, the several legs 18 and 20 are produced by perforating or scoring the material of the bottom wall 13 along the lines which constitute the margins of the three legs and their flaps or feet 19 and 21. The feet 19 and 21 are rendered easily foldable to their use positions at right angles to the legs proper by relatively light score lines 22. Similar relatively light score lines are employed where the wide ends of the legs 18 and 20 are hingedly connected with the edge wall 12 of the tray.

Figure 2:
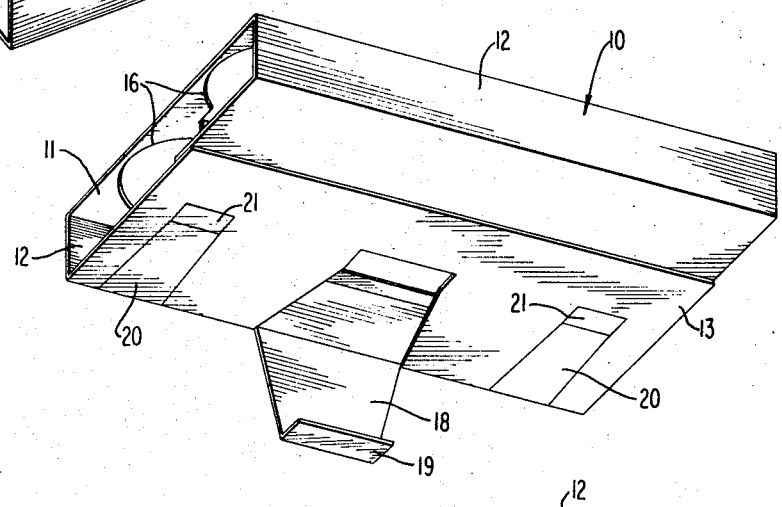
FIGURE 2 is a bottom perspective view of the service tray.

It will be readily understood that initially the legs 18 and 20 and their feeet 19 and 21 constitute integral portions of the bottom wall 13 and until they are extended to the use position substantially at right angles to the bottom wall 13, they lie in the same plane with the remainder of the bottom wall. This non-use condition or position of the three legs is illustrated in FIGURE 4. FIGURE 2 shows the outermost pair of legs 20 in the non-use position while the central leg 18 has been extended or folded to the use position.

Figure 3:
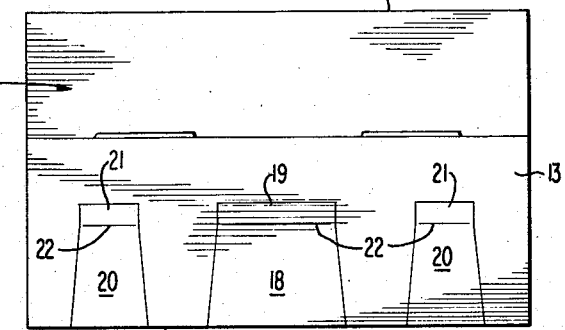
FIGURE 3 is an end elevational view of the tray in use upon an automobile seat.

FIGURE 3 depicts quite accurately the disposition of the tray upon the automobile seat during use. At least the center leg 18 is shown in the active position extending downwardly from the rear edge of the tray substantially at right angles thereof. The hinged foot 19 is resting directly upon the slanting seat 17. The forward lower corner 23 of the tray is engaging the surface of the seat 17 quite a distance forwardly from the seat back 24. The rear wall 12 of the tray is resting directly against the seat back 24 and through the hinged leg or prop 18 a portion of the weight of the tray and its contents is transferred to the seat back which actually aids in the support of the load. Friction at the point 23 prevents the tray from shifting forwardly on the inclined seat surface 17. The leg 18 or plural legs are fully capable of supporting the vertical component of the load on the tray. Thus, in a very unique manner, the invention enables the tray which is formed of extremely flimsy material to be leveled and stabilized on the slanting automobile seat without substantially increasing the cost of the tray when it is manufactured or interfering with its regular use in any way. The invention allows the otherwise conventional tray to be converted quickly from a tray for use on a flat level surface, such as a table, to one for use on a sloping surface, such as an automobile seat.

The construction of the legs 18 and 20, so that they are narrower near their free ends and wider where they connect with the tray body, is another important feature of the invention which lends maximum strength to the construction. The overall construction is extremely simple, compact and the tray with the invention thereon is easy to use. The use of the invention holds the beverage containers away from contact with the seat upholstery as shown clearly in FIGURE 3. Without the invention, the beverage containers must actually lean or prop themselves against the seat back to avoid falling over, and this delicate operation frequently results in spillage.

The several important advantages of the invention should now be apparent to those skilled in the art without the necessity for any further description herein.

It is to be understood that the form of the invention herewith shown and described is to be taken as a preferred example of the same, and that various changes in the shape, size and arrangement of parts may be resorted to, without departing from the spirit of the invention.

What is claimed is:

1. A service tray for drive-in restaurant service and the like comprising a tray body portion having a generally flat bottom wall and being provided in its top with food and beverage container compartments, said tray body portion constructed of relatively thin paperboard, at least one integral support leg hinged to the bottom wall of the tray adjacent one side edge thereof and said leg swingable to a dependent use position generally perpendicular to the bottom wall of the tray, whereby the tray may be supported in a substantially level and secure manner on the slanting surface of an automobile seat by placing the extended leg at the juncture of the seat and seat back and allowing the seat back to engage the side of the tray adjacent to the leg while the forward lower corner of the tray rests upon the seat substantially forwardly of the seat back, said support leg formed from the material of the tray bottom wall by a weakening operation on the bottom wall during manufacturing of the tray along a series of lines which define the shape of the leg, the leg occupying a non-use position in the plane of said bottom wall, said leg tapering gradually from its point of hinged attachment to said bottom wall toward its free end, and a narrow flap carried by the free end of the leg and hinged thereto on a transverse folding line and constituting a foot which engages the slanting seat when the leg is in the extended use position.

2. The structure of claim 1, and said service tray being collapsible to a thin flat condition and in such condition consisting essentially of two wall thicknesses of the paperboard, the tray having an erected use position and in such position constituting a relatively shallow rectangular tray body having a top wall spaced from said bottom wall and shallow side walls interconnecting the bottom and top walls, the tray being open-ended, hinged brace means on said tray body portion operable to lock the body portion in said erected use position and permitting collapsing of the tray to said flat non-use position, said top wall having plural opening means to accommodate food and beverage elements, and said integral support leg disposed substantially at the longitudinal center of the tray body portion between its open ends, and an additional pair of integral support legs of lesser width than said one support leg hinged to the bottom wall of the tray body portion near the opposite ends of the same and adjacent said one side edge, said additional pair of legs being of equal length with said one leg and augmenting the strength of said one leg when the tray is subjected to relatively heavy loads of food and beverage.

3. The structure of claim 2, and wherein all of said support legs are formed out of the material of the bottom wall of the tray body portion and said legs have folded flat non-use positions in the plane of the bottom wall rendering the service tray optionally useable on either a level or a slanting surface.

References Cited

UNITED STATES PATENTS

| | | | |
|---|---|---|---|
| 2,383,776 | 8/1945 | Cross | 248—459 X |
| 2,685,963 | 8/1954 | Loerinc | 248—174 X |
| 3,140,035 | 7/1964 | Wenzel | 229—30 |
| 3,149,270 | 7/1964 | Spillson | 229—30 |
| 3,318,456 | 5/1967 | Lipe | 297—194 X |
| 3,326,445 | 6/1967 | Goings | 229—28 |
| 3,326,446 | 6/1967 | Goings | 229—28 |

DAVIS T. MOORHEAD, Primary Examiner

U.S. Cl. X.R.

108—44; 211—73; 229—30; 248—174